US006948219B2

(12) United States Patent
Kakuda et al.

(10) Patent No.: US 6,948,219 B2
(45) Date of Patent: Sep. 27, 2005

(54) LATCH SYSTEM FOR CHILD SEAT

(75) Inventors: Baku Kakuda, Reading, PA (US); Douglas R. Bodmann, Shaker Heights, OH (US); James M. F. Hutchinson, Mohnton, PA (US); Michael L. Longenecker, Ephrata, PA (US); Joshua O. Mullen, Duncannon, PA (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 10/158,188

(22) Filed: May 31, 2002

(65) Prior Publication Data

US 2003/0221294 A1 Dec. 4, 2003

(51) Int. Cl.$^{7}$ .......................... A44B 21/00; F16B 45/00

(52) U.S. Cl. .................... 24/302; 24/265 H; 24/68 CD; 24/599.1

(58) Field of Search ................ 24/68 CD, 599.4–599.6, 24/599.9–600.2, 300–302, 318–321, 369–376, 298, 598.8, 599.1, 599.2; 294/82.1–822, 82.19–82.23; 297/250.1, 253, 463.1

(56) References Cited

U.S. PATENT DOCUMENTS

| | | | | |
|---|---|---|---|---|
| 194,442 A | | 8/1877 | Knapp et al. | |
| 310,035 A | * | 12/1884 | Easton | 24/599.6 |
| 370,333 A | * | 9/1887 | Huff | 24/600.4 |
| 496,012 A | | 4/1893 | Smith | |
| 691,690 A | | 1/1902 | Wroe | |
| 755,964 A | | 3/1904 | Swanson | |
| 760,171 A | | 5/1904 | Atwell | |
| 768,817 A | * | 8/1904 | Nearing | 24/599.6 |

(Continued)

FOREIGN PATENT DOCUMENTS

| | | |
|---|---|---|
| EP | 0 799 586 | 10/1997 |
| FR | 523953 | 8/1921 |
| FR | 2 596 338 | 10/1987 |

(Continued)

OTHER PUBLICATIONS

Article: "New Child Seat Rules Issued", *on Health Daily Briefing* Sep. 2, 1999 http://onhealth.com/ch1/briefs/item, 48545.asp.
Article: "Government Promotes Booster Seats", *on Health Daily Briefing* Feb. 15, 2000—http://onhealth.com/ch1/briefs/item%2C79793.asp.
Article: "Buyer's Guide To Car Restraints", *BabyBusiness* (Century Products Co. 1994).
Photograph of First IMMI Latch System, 1p.
Photographs of second IMMI Latch System, 3 pp.
Photographs of thrid IMMI Latch System, 2 pp.
Photograph of carton for EZ Latch Lower Anchorage Belt System, 1 pp. (latch system available pre–Feb. 2002).
Photograph of carton for Lower Anchorage Belt System with EZ Latch, 1 pp. (latch system available pre–Feb. 2002.).

*Primary Examiner*—J J Swann
*Assistant Examiner*—Ruth C. Rodriguez
(74) *Attorney, Agent, or Firm*—Foley & Lardner LLP

(57) ABSTRACT

A latch system for attaching a child seat to an anchorage of a vehicle seat includes a first latch device connected to a first end of a length of webbing, an adjuster connected to a second end of the length of webbing, and a second latch device. The adjuster has a plate member extending from one end, and the plate member has a connection opening formed therein. The second latch device includes a main member having a hook formed at a first end and a connection aperture at a second end that is distal from the first end. A portion of the second end of the main member passes through the connection opening, and a portion of the plate member passes through the connection aperture.

17 Claims, 15 Drawing Sheets

U.S. PATENT DOCUMENTS

| | | | | | |
|---|---|---|---|---|---|
| 830,101 | A | * | 9/1906 | Powell | 24/165 |
| 833,998 | A | * | 10/1906 | Carpenter | 24/176 |
| 980,269 | A | * | 1/1911 | Hunold | 74/81.6 |
| 1,032,369 | A | | 7/1912 | Baxter | |
| 1,092,238 | A | * | 4/1914 | Baxter | 24/599.6 |
| 1,540,030 | A | * | 6/1925 | Mestars | 24/599.4 |
| 1,713,360 | A | * | 5/1929 | Woodling | 81/15.8 |
| 1,767,368 | A | | 6/1930 | Jensen | |
| 1,853,848 | A | | 4/1932 | Cross | |
| 2,099,139 | A | * | 11/1937 | Jensen | 24/165 |
| 2,531,442 | A | * | 11/1950 | Junker | 24/321 |
| 2,541,442 | A | * | 2/1951 | Skoog | 452/149 |
| 2,612,139 | A | * | 9/1952 | Collins | 119/865 |
| 2,630,609 | A | * | 3/1953 | Le Bus | 24/68 CT |
| 2,863,200 | A | | 12/1958 | Miller et al. | |
| 2,867,406 | A | | 1/1959 | Davis | |
| 2,874,431 | A | | 2/1959 | Elsner | |
| 2,896,288 | A | | 7/1959 | Davis | |
| 2,933,795 | A | | 4/1960 | Meeker | |
| 3,052,500 | A | | 9/1962 | Hyde | |
| 3,131,446 | A | | 5/1964 | Davis | |
| 3,131,451 | A | | 5/1964 | Fisher | |
| 3,157,432 | A | | 11/1964 | Watkins | |
| 3,170,211 | A | | 2/1965 | Van Noord | |
| 3,181,215 | A | | 5/1965 | Eberhart | |
| 3,189,966 | A | | 6/1965 | Craven | |
| 3,228,082 | A | | 1/1966 | Skerry | |
| 3,233,300 | A | | 2/1966 | Meeker | |
| 3,241,206 | A | * | 3/1966 | Greenfield | 24/646 |
| 3,242,547 | A | | 3/1966 | Krengel | |
| 3,265,439 | A | | 8/1966 | McEwen | |
| 3,270,388 | A | | 9/1966 | Humphrey | |
| 3,317,972 | A | * | 5/1967 | Harley | 24/599.4 |
| 3,328,858 | A | * | 7/1967 | Connolly et al. | 24/599.4 |
| 3,345,070 | A | * | 10/1967 | Wilson et al. | 473/502 |
| 3,357,615 | A | | 12/1967 | Hill | |
| 3,357,736 | A | | 12/1967 | McCarthy | |
| 3,358,340 | A | * | 12/1967 | Higuchi | 24/599.8 |
| 3,418,008 | A | * | 12/1968 | Durbin | 24/270 |
| 3,481,009 | A | | 12/1969 | Preston et al. | |
| 3,575,458 | A | * | 4/1971 | Crook, Jr. | 294/82.2 |
| 3,600,768 | A | | 8/1971 | Romanzi, Jr. et al. | |
| 3,718,948 | A | | 3/1973 | Dartois | |
| 4,047,755 | A | | 9/1977 | McDonald et al. | |
| 4,110,847 | A | | 9/1978 | Dera | |
| 4,231,612 | A | | 11/1980 | Meeker | |
| 4,304,403 | A | * | 12/1981 | Wilson | 473/502 |
| 4,340,999 | A | * | 7/1982 | Chini | 24/599.4 |
| 4,358,232 | A | * | 11/1982 | Griffith | 24/68 CD |
| 4,368,563 | A | | 1/1983 | Lentz | |
| 4,400,907 | A | * | 8/1983 | Alter et al. | 446/28 |
| 4,559,678 | A | * | 12/1985 | Birkenstock | 24/323 |
| 4,567,628 | A | * | 2/1986 | Prete, Jr. et al. | 24/68 CD |
| 4,577,374 | A | | 3/1986 | Lii | |
| 4,577,377 | A | | 3/1986 | Kasai | |
| 4,637,622 | A | | 1/1987 | Burgard | |
| 4,685,740 | A | | 8/1987 | Föhl | |
| 4,697,849 | A | | 10/1987 | Smith | |
| 4,731,912 | A | | 3/1988 | Boriskie et al. | |
| 4,822,104 | A | | 4/1989 | Plesniarski | |
| 4,854,638 | A | | 8/1989 | Marcus et al. | |
| 4,866,819 | A | | 9/1989 | Kasai | |
| 4,867,464 | A | | 9/1989 | Cook | |
| 5,031,960 | A | | 7/1991 | Day | |
| 5,080,191 | A | | 1/1992 | Sanchez | |
| 5,123,147 | A | | 6/1992 | Blair | |
| 5,138,751 | A | | 8/1992 | Shima et al. | |
| 5,146,657 | A | * | 9/1992 | Frano | 24/265 H |
| 5,167,203 | A | | 12/1992 | Scott et al. | |
| 5,265,931 | A | | 11/1993 | Ryan | |
| 5,269,578 | A | | 12/1993 | Fandrey | |
| 5,279,021 | A | | 1/1994 | Edgin | |
| 5,378,046 | A | | 1/1995 | Gordy et al. | |
| 5,402,557 | A | * | 4/1995 | Dalen | 24/68 CD |
| 5,466,044 | A | | 11/1995 | Barley et al. | |
| 5,471,717 | A | | 12/1995 | Ennerdal et al. | |
| 5,499,860 | A | | 3/1996 | Smith et al. | |
| 5,604,964 | A | | 2/1997 | Aoshima | |
| 5,630,645 | A | | 5/1997 | Lumley et al. | |
| 5,660,445 | A | | 8/1997 | Murray | |
| 5,695,243 | A | | 12/1997 | Anthony et al. | |
| 5,699,594 | A | | 12/1997 | Czank et al. | |
| 5,832,571 | A | * | 11/1998 | Kanamori | 24/599.6 |
| 5,909,927 | A | | 6/1999 | Henshall | |
| 5,927,235 | A | | 7/1999 | Olaiz | |
| 6,017,087 | A | | 1/2000 | Anthony et al. | |
| 6,209,957 | B1 | | 4/2001 | Baloga et al. | |
| 6,269,991 | B1 | * | 8/2001 | Hood et al. | 224/258 |
| 6,308,385 | B1 | * | 10/2001 | Ball | 24/574.1 |
| 6,729,511 | B2 | * | 5/2004 | Dent, III | 224/259 |
| 2002/0175545 | A1 | * | 11/2002 | Cone | |

FOREIGN PATENT DOCUMENTS

| | | |
|---|---|---|
| GB | 0002997 | 3/1889 |
| GB | 341345 | 1/1931 |
| GB | 867510 | 5/1961 |
| GB | 937 459 | 9/1963 |
| GB | 976 863 | 12/1964 |
| GB | 1058668 | 2/1967 |
| GB | 1085793 | 10/1967 |
| GB | 1129999 | 10/1968 |
| GB | 1 222 965 | 2/1971 |
| GB | 1 327 080 | 8/1973 |
| GB | 1 374 266 | 11/1974 |
| GB | 2 284 228 | 5/1995 |
| GB | 2 309 999 | 8/1997 |
| GB | 2 351 118 | 12/2000 |
| WO | WO 01/34428 | 5/2001 |

* cited by examiner

LATCH SYSTEM FOR CHILD SEAT

BACKGROUND OF THE INVENTION

The present invention relates generally to child vehicle seats. More specifically, the present invention relates to a latch system that can be used to facilitate connection of the seat, in either one or both of forward and rearward facing orientations, to anchor members rigidly connected with the vehicle chassis.

Newer vehicles are being constructed to better facilitate connection of child seats to the rear seats of the vehicle. For example, new regulations have been promulgated that will require child seat manufacturers to include a provision on the child seat to secure the seat to a pair of anchor members secured to the vehicle chassis. These anchor members consist of essentially U-shaped metal brackets that are accessible between the lower edge of the vehicle back cushion and the rear edge of the vehicle seat cushion.

Some child seats are equipped with a seat restraint system designed to connect to anchor members provided in the vehicle seats in accordance with the new regulations. One such restraint system includes two separate securing straps. One end of each securing strap is connected to the child seat by mount plates. These mount plates are pivotally connected to the child seat via, for example, a suitable bolt arrangement. The other end of each strap is provided with hook-like attachment latches that can be hooked onto and engaged with the anchor members. The hook-like attachment latches can include a curved finger portion and a resiliently biased clip which, in combination, form a passage for extending about the anchor in a secure but removable manner. The securing straps are pivotally mounted to the child seat so that the child seat can be selectively oriented either forwardly or rearwardly with respect to the forward direction of travel of the vehicle.

However, since the two securing straps are separately connected to the child seat, each strap must be adjustable to allow for vehicles having varying seat configurations and to allow the child seat to be snugly tethered in place. This, of course, undesirably increases cost and complexity of the child seat. Additionally, the number of operations needed to install the child seat in position is increased.

Another known arrangement includes a single belt arrangement which can be used to secure the child vehicle seat in position. This arrangement comprises a length of webbing, a first latch at one end of the webbing, a latch roller adjuster at the other end of the webbing, and a second latch connected to the latch roller adjuster by a short length of webbing.

An example of the connection between the latch roller adjuster and the second latch is shown in FIG. 1. In this arrangement, a latch roller adjuster 10 interconnects a main length of webbing 12 and a short length of webbing 14. The short length of webbing 14 interconnects the latch roller adjuster 10 and a latch 16, which includes a hooked end 18 and a flat spring member 20. The latch roller adjuster 10 enables the overall length of the belt arrangement to be shortened when cinching a child vehicle seat into a snug position on a rear passenger seat of a vehicle, such as an automotive vehicle.

The arrangement of FIG. 1 enables the latch to be rotated with respect to the latch roller adjuster and thus facilitates connection to an anchor member located to the rear of the seat. However, the short length of webbing 14 introduces a drawback in that, after cinching of the latch arrangement, the latch roller adjuster 10 ultimately may be located in front of the child seat shell, as depicted in FIG. 2. That is, it may be located in a position where it can contact the back/torso of a child restrained in the seat 17, causing discomfort to the child.

Thus, there remains a need for a non-rigid latch system for a child vehicle seat which facilitates the interconnection of a latch with an anchor member mounted to the vehicle, but which obviates the above-mentioned problem(s).

SUMMARY OF THE INVENTION

It is therefore an object of the present invention to provide a latch system that that can be applied to existing seats and that solves the aforementioned problems and drawbacks of the above type of arrangements. This object is not limiting on the present invention, as many other advantageous and objects of the present invention are provided, as discussed further below. Furthermore, all of the deficiencies of existing child seat designs, discussed above, are not necessarily overcome by each exemplary embodiment of the present invention discussed below.

A first aspect of the invention resides in a latch system for attaching a child seat to an anchorage of a vehicle seat. The latch system comprises a first latch device connected to a first end of a length of webbing; an adjuster connected to a second end of the length of webbing, the adjuster having a plate member extending from one end, the plate member having a connection opening formed therein; and a second latch device. The second latch device includes a main member having a hook at a first end and a connection aperture at a second end that is distal from the first end. A portion of the second end of the main member passes through the connection opening, and a portion of the plate member passes through the connection aperture.

A second aspect of the invention resides in a latch system that comprises a latch device, which includes a main member having a hook portion at one end and a connection aperture at an opposite end, and a closure member having blocking members. The hook portion has a mouth through which an anchorage can pass and become engaged by the hook. The closure member is pivotal with respect to the main member, wherein the blocking members are located on either side of an end portion of the hook portion and adjacent the mouth so as to block ingress/egress of the anchorage relative to the hook portion. In addition, the closure member is pivotable away from the closure position to a release position to move the blocking members away from the mouth of the hook portion, thereby permitting ingress/egress of the anchorage relative to the mouth of the hook portion. The latch system also comprises an adjuster connected to a length of webbing, and a connection interconnecting the adjuster and the latch device. The adjuster includes a plate member in which a connection opening is formed.

The above latch system also can comprise a housing, the housing being connected to the main member and pivotally supporting the closure member on the main member. Further, in the above latch system, the connection can comprise a portion of the main member passing through the connection opening, and a portion of the plate member passing through the connection aperture.

Alternatively, the connection can comprise a ring member which passes through the connection aperture and the connection opening.

As a further variation, the connection can comprise a piece of webbing interconnecting the adjuster and the latch device, the webbing passing through the connection aperture. As yet a further variation, the connection can comprise a pivot pin which passes through the connection opening and the connection aperture. In this latter variation, the plate member can be pivotally connected to the adjuster.

Another aspect of the invention resides in a latch device comprising a housing, a main member having a hook portion at one end and a connection aperture at an opposite end, and a closure member having blocking members. The hook portion has a mouth adapted to permit an anchorage to pass therethrough and to become engaged by the hook portion. The closure member is pivotally supported on the housing and biased toward a closure position, wherein the blocking members are located on either side of an end portion of the hook portion and adjacent the mouth so as to block ingress/egress of the anchorage relative to the mouth of the hook portion. Further, the closure member is pivotable away from the closure position to a release position to move the blocking members away from the mouth of the hook portion, thereby permitting ingress/egress of the anchorage relative to the mouth of the hook portion.

In this arrangement, the closure member further can include an extension member that extends between and interconnects the blocking members and that extends beyond lower edges of the blocking members so as to be abutable with the anchorage when the latch device is brought into contact with the anchorage.

In the above arrangement, the connection aperture can be hourglass-shaped, D-shaped, elongate or so dimensioned and sized to have webbing passed therethrough. The connection aperture can extend in a direction which is essentially parallel with an axis about which the closure member is pivotal, or it can extend in a direction that is essentially perpendicular to an axis about which the closure member is pivotal.

Another aspect of the invention resides in a latch system for attaching a child seat to an anchorage of a vehicle seat that comprises an adjuster connected to an end of a length of webbing, and a latch device. The latch device is directly coupled to the adjuster to establish an interconnection that permits the latch device and the adjuster to be movable with respect to one another about three mutually perpendicular axes.

A yet further aspect of the invention resides in a method of assembling a latch device and an adjuster. The method comprises disposing a first hook formed at a first end of a main member of the latch device through an opening formed in a portion of the adjuster; disposing the main member into a housing so that a second hook formed at a second end of the main member extends out of a leading end of the housing; and engaging snap connection features formed on the housing and the main member to permanently retain the main member in the housing and maintain a rear end portion of the housing in a position wherein the housing is positioned relative to a terminal end of the first hook to prevent disconnection of the main member and the adjuster.

This method can further include disposing a closure member over the main member; disposing a spring between the closure member and the main member; and pivotally supporting the closure member on the housing.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

FIG. 4A depicts the latch device being applied to an anchorage, FIG. 4B depicts the latch device opened and in a state which permits ingress/egress of the anchorage from the hook of the latch device, and FIG. 4C depicts the anchorage received and retained in the hook of the latch device;

DETAILED DESCRIPTION OF THE PREFERRED EMBODIMENTS

Figure 1:
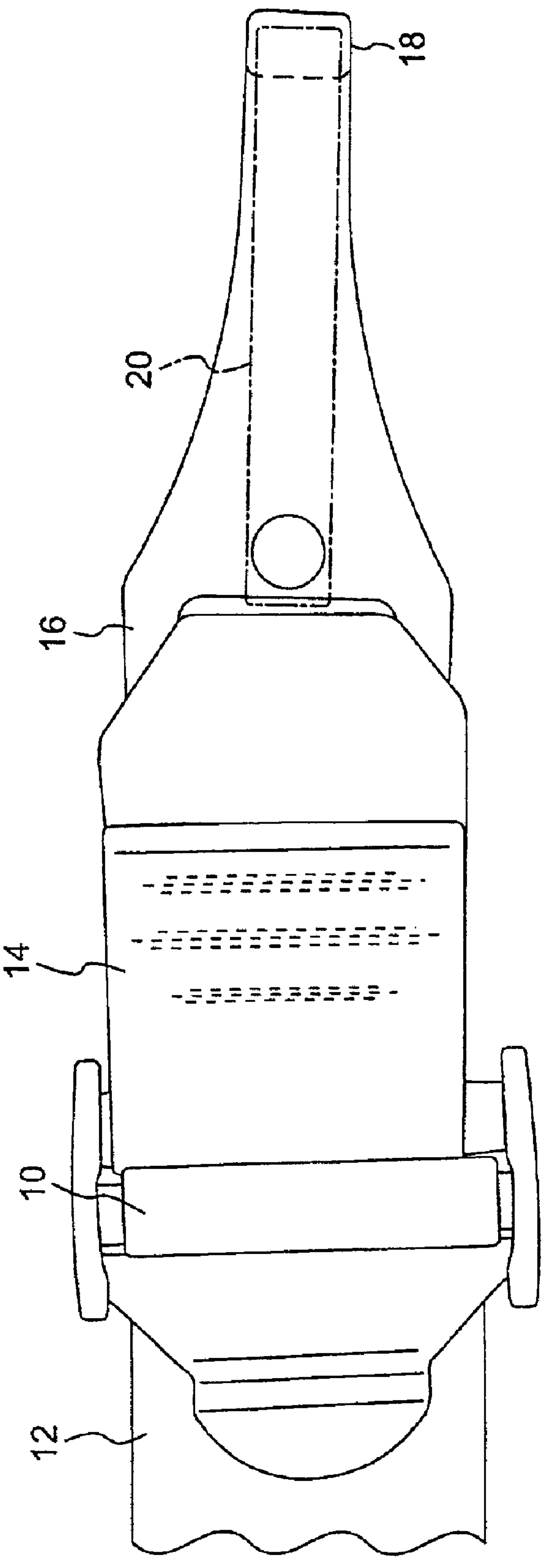
FIG. 1 is a plan view of a conventional latch arrangement.
Figure 2:
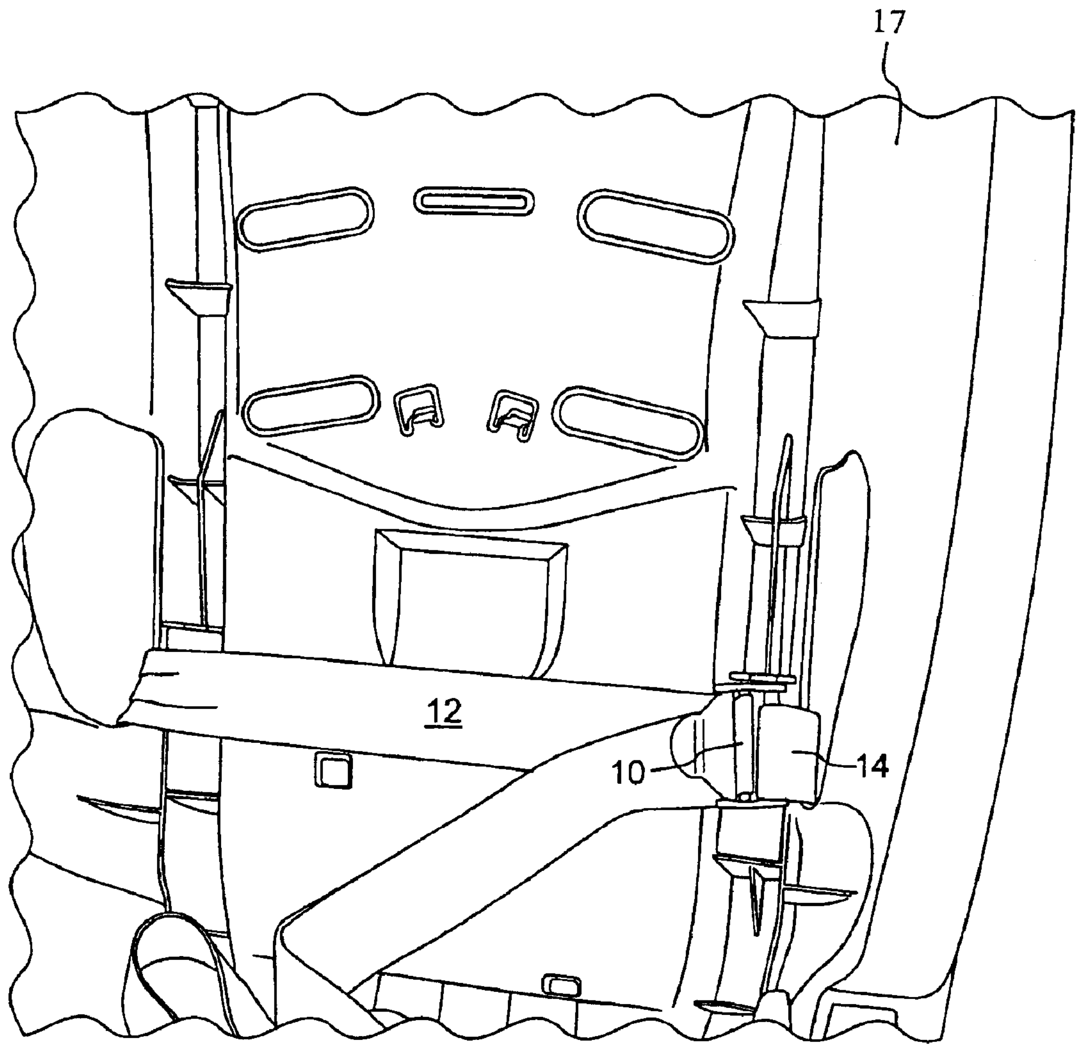
FIG. 2 is a perspective view of the conventional latch arrangement of FIG. 1 employed in a child vehicle seat, demonstrating the position the strap adjuster assumes after the child vehicle seat is secured to the vehicle.
Figure 3:
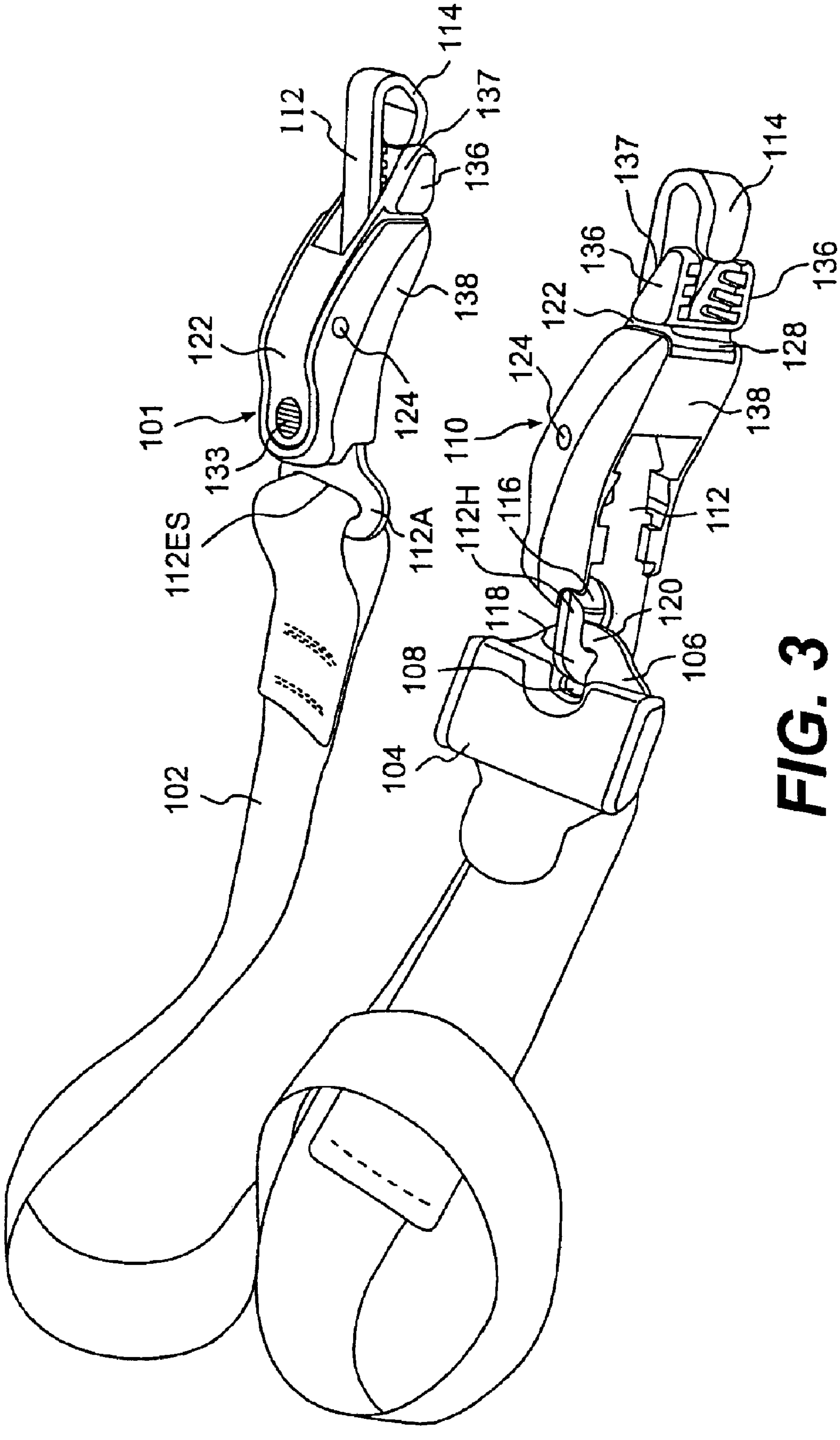
FIG. 3 is a perspective view showing a latch system in accordance with the present invention.

FIGS. 3–9 show one embodiment of the latch system for attaching a child vehicle seat to anchorages mounted to the rear seats of the vehicle. FIG. 3 depicts a latch system which comprises a first latch device 101 connected to a first end of a length of webbing 102, an adjuster 104 connected to a second end of the webbing 102, and a second latch adjuster 110 connected to the adjuster 104. The adjuster 104 allows adjustment of the length of webbing 102 once the latch system has been engaged with the anchorages of the vehicle seat. Although the illustrated adjuster is a latch roller adjuster, it will be understood that the latch system of the present invention can include any suitable adjuster, such as a pinch adjuster. The latch roller adjuster 104 has a substantially flat plate 106 extending from one end. This plate 106 has a connection opening 108 formed therein. The second latch device 110 is connected to the plate 106.

The connection between the latch roller adjuster 104 and the second latch device 110 is highly robust and permits the latch device 110 to be movable relative to the latch roller adjuster 104 about three mutually perpendicular axes (that is, the second latch device has three dimensions of adjustment with respect to the latch roller adjuster), or about any combination of those axes, as will become more apparent from the following description. This arrangement also enables the length L of the latch system from the center of the anchor point to the furthest edge of the load bar of the latch roller adjuster 104 to be reduced to within a predetermined value, for example, 5.5 inches. This length limitation ensures that the latch roller adjuster 104 does not encroach into the belt path along the frontal seat area of the child seat shell.

The second latch device 110 includes a housing 138 and a main or central rigid member 112 fixedly mounted to the housing 138. The main member 112 acts as a basic chassis or backbone of the device 110. A hook 114 is formed at a first end of the main member 112, and a connection aperture 116 is formed at a second end of the main member 112, distal from the first end. As shown in FIG. 3, a portion 118 of the second end of the main member 112 passes through the connection opening 108 of the plate 106, and a portion 120 of the plate 106 passes through the connection aperture 116.

The first latch device 101 differs from the second latch device 110 in this embodiment in that the end of the main member 112A of the first latch device 101 is formed with an elongate slot 112ES through which the end of the webbing 102 is passed and sewn into a loop. It will be understood, however, that in other embodiments latch devices 101, 110 can have the same construction.

Figure 4A:
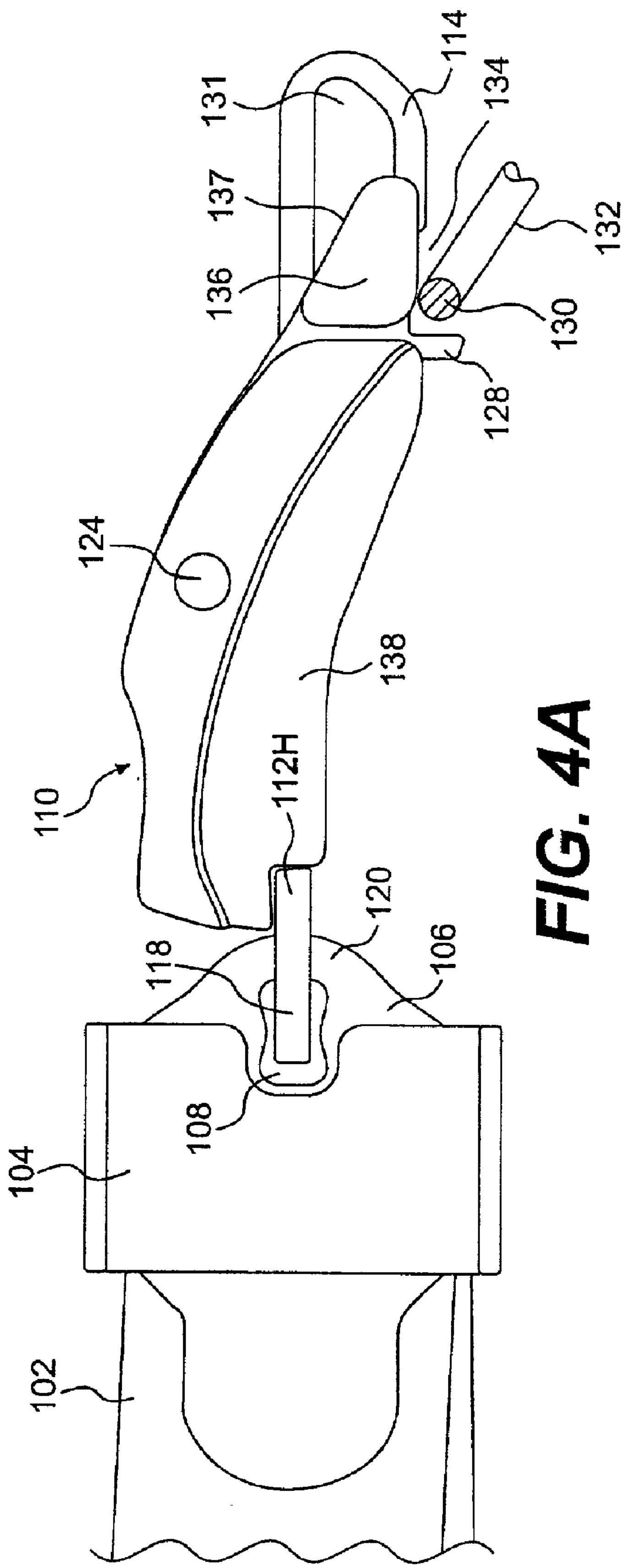
FIGS. 4A to 4C are respectively side views of a latch device and an adjuster connected in accordance with the present invention, where

In the illustrated arrangement, and as best seen in FIG. 4A, the connection opening 108 has an essentially hourglass shape. The connection aperture 116, on the other hand, is formed by hook 112H on the end of the main member 112. The mid-portion of the hook 112H defines the connection aperture 116. This enables ready assembly of the latch roller adjuster 104 to the latch device 110 in that, prior to assembly of the housing 138 to the latch device 110, the hook 112H can be passed through the connection opening 108. Once portion 120 of the latch roller adjuster 104 passes into connection aperture 116, the housing 138 can be secured in position on the main member 112. The housing 138 closes off the open end of the hook 112H and prevents disconnection of the latch device 110 and the latch roller adjuster 104.

In other embodiments, the connection aperture 116 can be formed similarly to the hourglass shape of the connection opening 108. The hourglass shape reduces the open area of the opening 108 and ensures that a finger or other object cannot enter and become entrapped in and/or injured by the connection opening 108.

This hourglass configuration also permits the latch device to roll, pitch and yaw about the above-mentioned three mutually perpendicular axes. More specifically, as seen in FIG. 4A, the latch device 110 can rotate about its longitudinal axis, can pivot up and down, and can swing from side to side. While some of these dimensions of movement are limited, the ability of the latch device 110 to move about these axes facilitates easy maneuvering of the latch device 110 when engaging the latch device 110 with an anchor member 132 in the manner depicted in FIG. 9. It also enables the latch roller adjuster 104 to adjust its orientation relative to the latch device 110, thereby aligning the path of the webbing 102 with the latch roller adjuster 104.

Figure 4B:
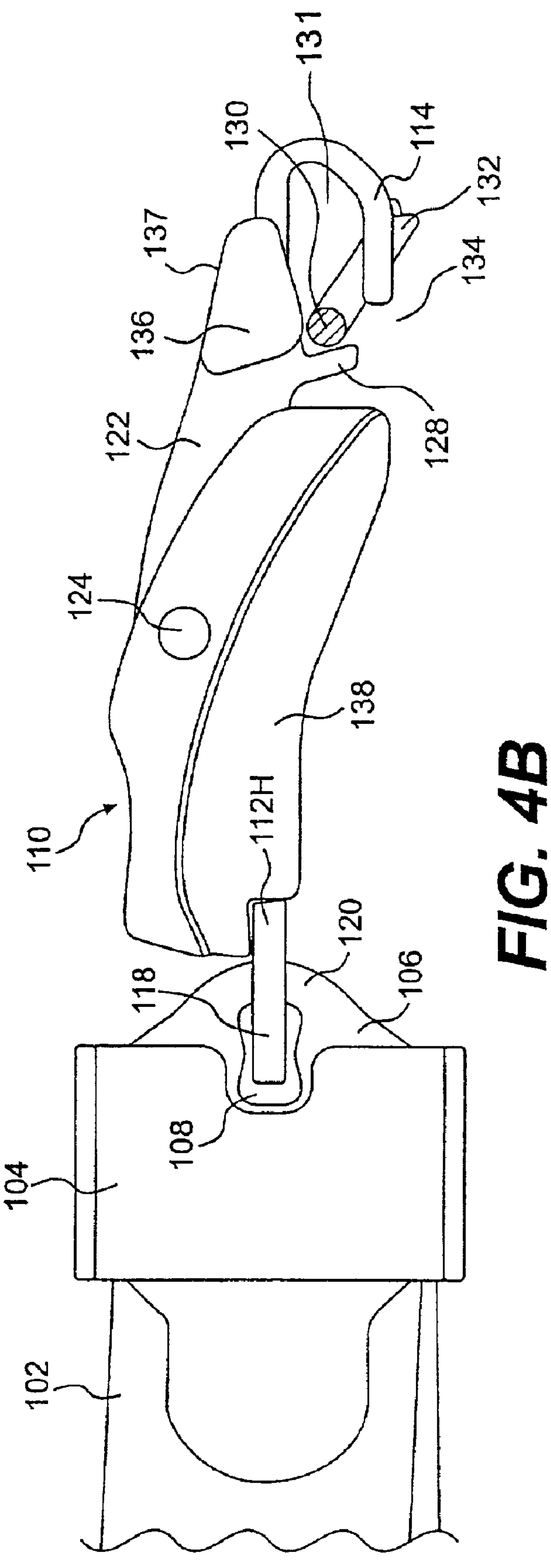

Each of the latches 101, 110 shown in FIG. 3 also includes a closure member 122 pivotally supported on the housing 138. The closure member 122 is adapted to pivot about a pivot shaft 124 between a closure position, as shown in FIG. 4A, and release position, as shown in FIG. 4B. The closure member 122 is biased toward the closure position by a spring plate 126, shown in FIG. 6, disposed between the main member 112 and the closure member 122.

Figure 4C:
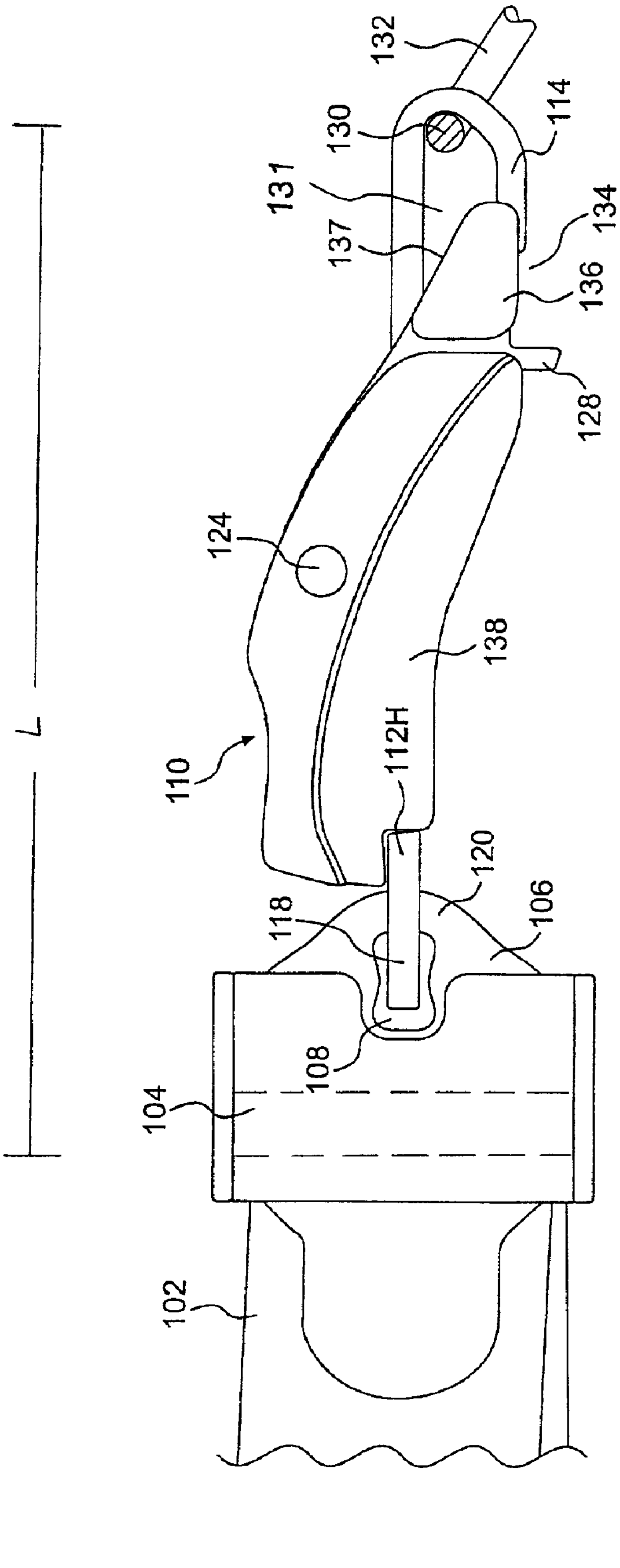

The closure member 122 includes an extension 128 adapted to engage an anchorage 130 which forms part of anchor member 132, as shown, for example, in FIGS. 4A and 4B. The extension 128 promotes first time interconnection of the latch device 110 with the anchorage 130. More specifically, the extension 128 extends downward from the closure member 122 so that, as the closure member 122 is moved toward the anchorage 130 (as shown in FIG. 4B), the front surface of the extension 128 comes into contact with the anchorage 130. Further movement of the closure member 122 towards the anchorage 130 causes the closure member 122 to pivot against the bias of the spring plate 126, away from the mouth 134 of the hook 114, from the closure position to the release position, thereby enabling the anchorage 130 to pass into the anchorage receiving area 131 defined by the hook 114. Once the anchorage 130 is in the receiving area 131, the spring plate 126 can bias the closure member 122 back to the closure position, thereby trapping the anchorage 130 in the receiving area 131, as shown in FIG. 4C. In this manner, the extension 128 facilitates movement of the anchorage 130 relative to the latch device 110 toward the mouth 134 of the hook 114 and into the receiving area 131. This is advantageous in that the anchorages are accessed between a seat cushion and a cushion of the seat back of the vehicle seat and, thus, can be hard to see.

To release the anchorage 130 from the receiving area 131, the child caregiver can manually pivot the closure member 122 from the closure position to the release position by depressing the upper surface of the closure member 122 at an end opposite the extension 128. In this regard, the upper surface of the closure member 122 can include a finger actuation area 133, as seen best in FIGS. 3, 5, and 8. When the caregiver presses on the finger actuation area 133, the closure member 122 pivots about the pivot shaft 124, causing the extension end of the closure member 122, opposite the finger actuation end, to lift up and away from the mouth 134 of the hook 114. This movement of the closure member 122 opens the mount 134 for release of the latch device 110 from the anchorage 130.

The closure members 122 each also include at least one blocking member 136, located adjacent a lateral side of the hook 114 and adjacent a mouth 134 of the hook 114. In the illustrated embodiment of FIGS. 3–9, each closure member 122 is provided with a pair of blocking members 136. Nevertheless, it will be understood that, in alternative embodiments, a single blocking member can provide the function of blocking ingress/egress of the anchorage 130 from the anchorage receiving area 131 when the closure member 122 is in the closure position (see FIGS. 4C and 6).

Figure 5:
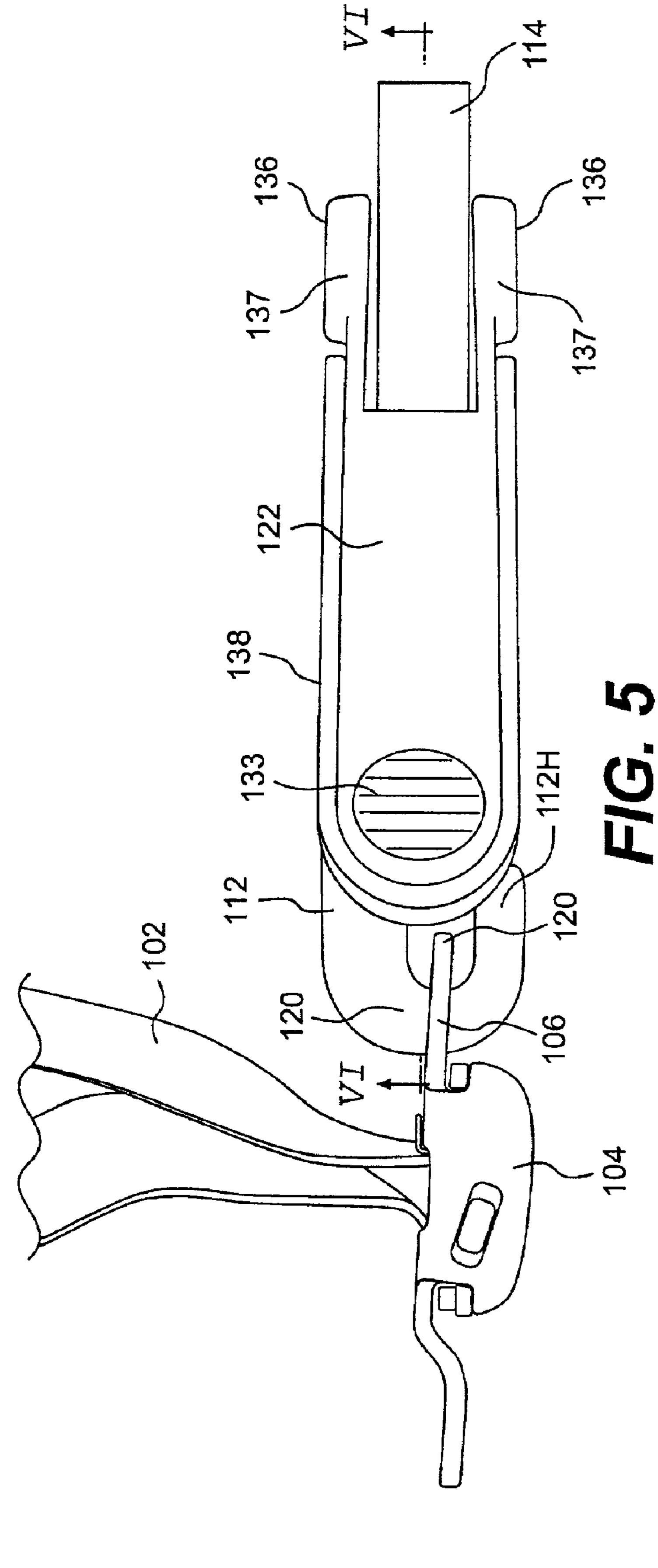
FIG. 5 is a top plan view of the latch device and adjuster arrangement depicted in FIGS. 4A–4C.
Figure 6:
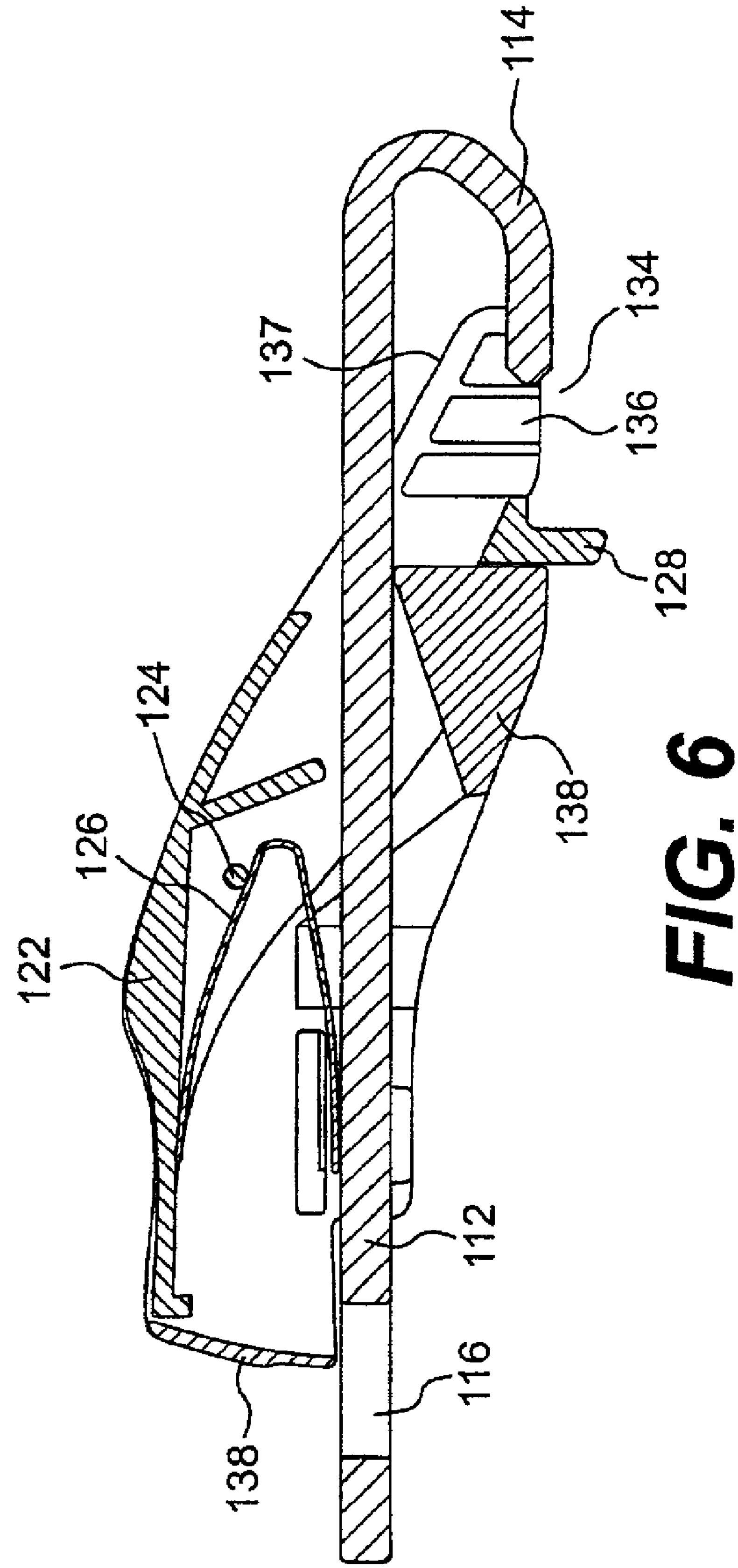
FIG. 6 is a section view taken along section line VI—VI of FIG. 5.

As will be appreciated from FIGS. 3, 5, and 6, for example, the blocking members 136 are located beside the hook 114 (that is, the blocking members 136 are slightly laterally offset from the sides of the hook 114), and do not cover the mouth 134 of the hook 114. The blocking members 136 prevent ingress or egress of the anchorage 130 relative to the anchorage receiving area 131 when the closure member 122 is in the closure position, even though the mouth 134 of the hook 114 is not blocked per se. In addition, the top surfaces 137 of the blocking members 136 are ramped so that, once the anchorage 130 is trapped in the receiving area 131, any movement of anchorage 130 toward the blocking members 136 tends to maintain the closure member 122 in its closure position.

The extension member 128 and the blocking members 136 are oriented essentially perpendicular to each other. The extension member 128 extends between rear edges of and interconnects the blocking members 136, adding to the total strength of the closure member 122. The inboard surfaces of the blocking members 136 can be ribbed to improve their rigidity. In addition, as seen in FIGS. 4A–4C, the extension member 128 extends beyond the lower edges of the blocking members 136 so that the blocking members 136 do not interfere with contact between the extension member 128 and the anchorage 130.

The main, rigid member 112 acts as a basic strength providing chassis/backbone for the device 110 and is made of a suitable material, such as steel. This facilitates formation of the hook 114 and the connection aperture 116. It will be understood, however, that the main member 112 need not be made of steel, or even metal for that matter, so long as sufficient structural strength can be provided for the intended latching purpose.

The housing 138 of the latch devices 101, 110 encloses a mid-portion of the main member 112. This housing 138 supports the pivot shaft 124 about which the closure member 122 pivots. The pivot shaft 124 can comprise a rivet that is fastened at its ends to the walls of the housing 138, a bolt, or the like.

As described above, the first embodiment of the invention facilitates assembly of the latch device 110 and the latch roller adjuster 104. Inasmuch as the end of the main member 112 is formed with a hook 112H disposable through the hourglass shaped connection opening 108 of the latch roller adjuster 104, and placement of the housing 138 on the main member 112 closes off the open end of the hook 112H, the connection between the latch device 110 and the latch roller adjuster 104 is permanent.

Figure 7:
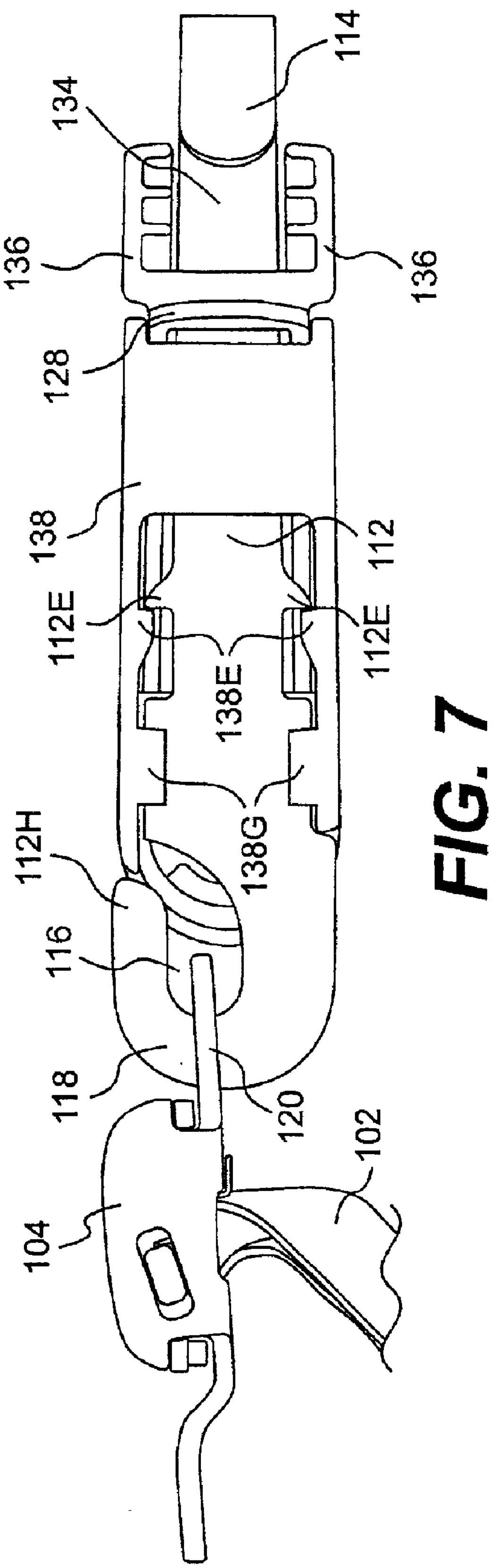
FIG. 7 is a bottom plan view of the latch device and adjuster arrangement depicted in FIGS. 4A–4C.
Figure 8:
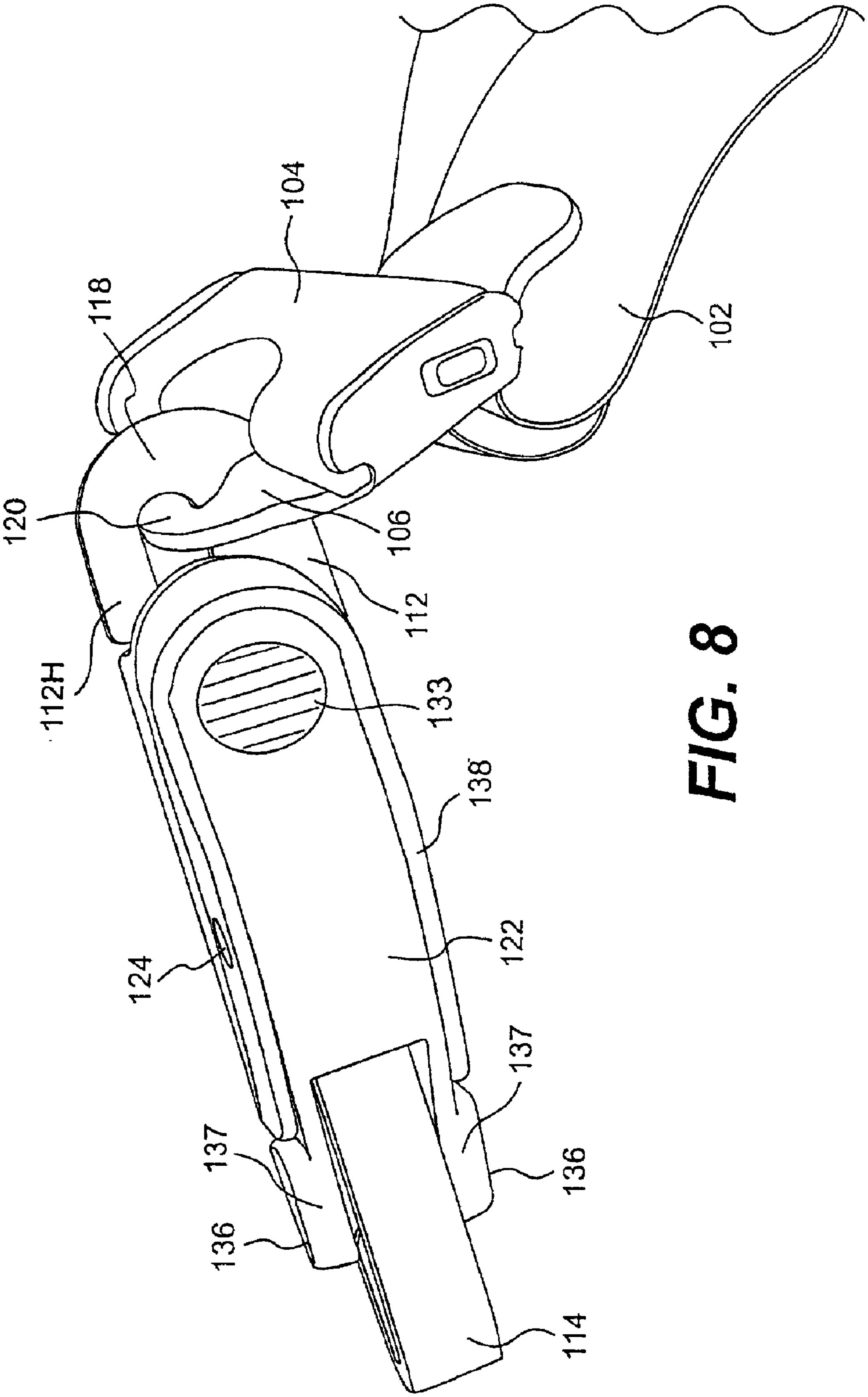
FIG. 8 is a perspective view of the latch device and adjuster arrangement depicted in FIGS. 4A–4C.
Figure 9:
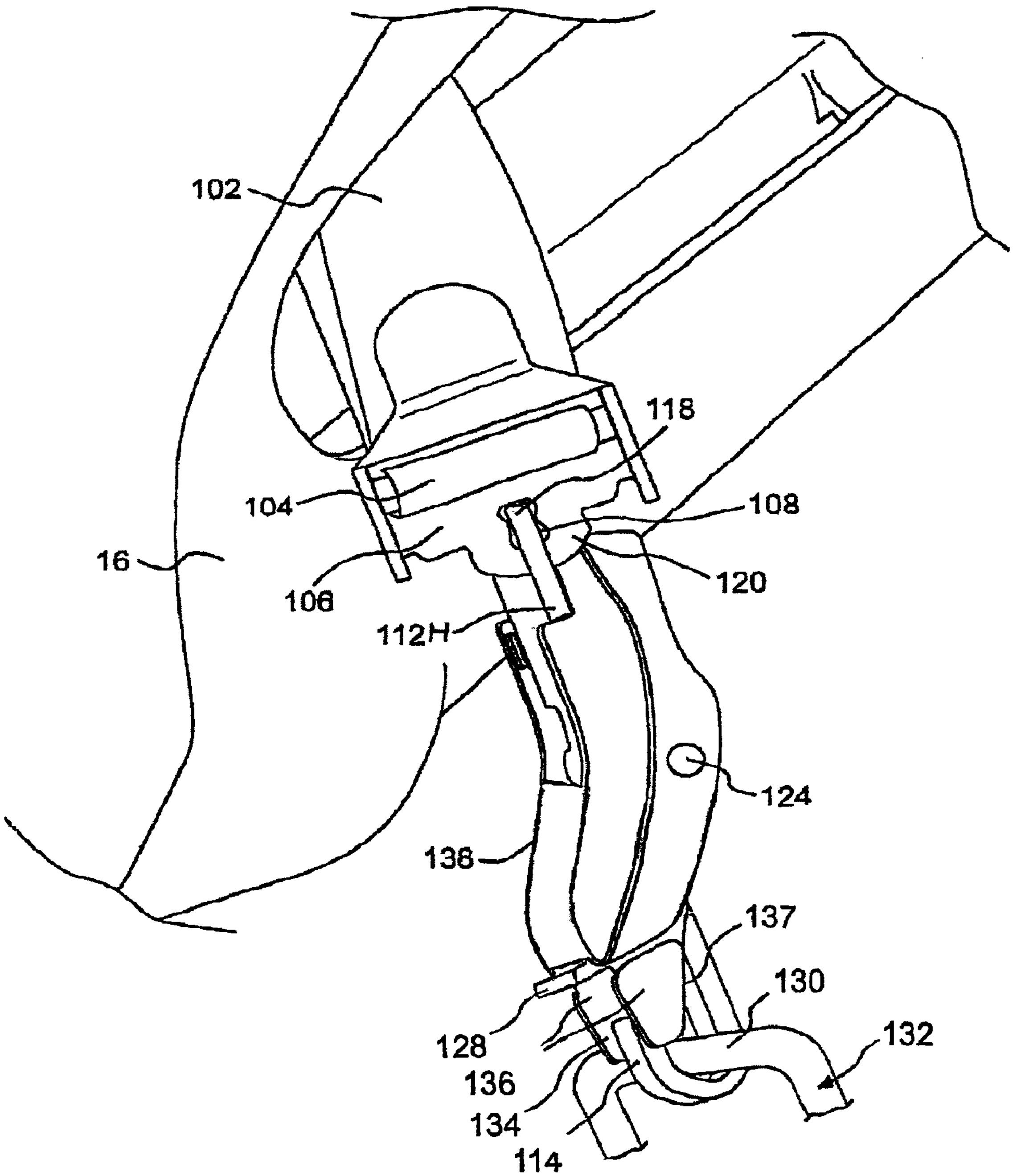
FIG. 9 is a perspective view which shows the latch device and adjuster arrangement depicted in FIGS. 4A–4C operatively connecting a child vehicle seat to an anchor member provided in a vehicle.

To facilitate interconnection between the housing 138 and the main member 112, the underside of the housing 138 is provided with both guide and engagement features 138G, 138E, respectively, as best seen in FIG. 7. The engagement features 138E engage with barbs 112E formed on the main member 112. The main member 112 can be slid into position in the housing 138 and snapped into a locked position via engagement of the feature 138E and barbs 112E. As shown in FIG. 7, the open end of the hook 112H is closed by the presence of the housing 138.

Figure 10:
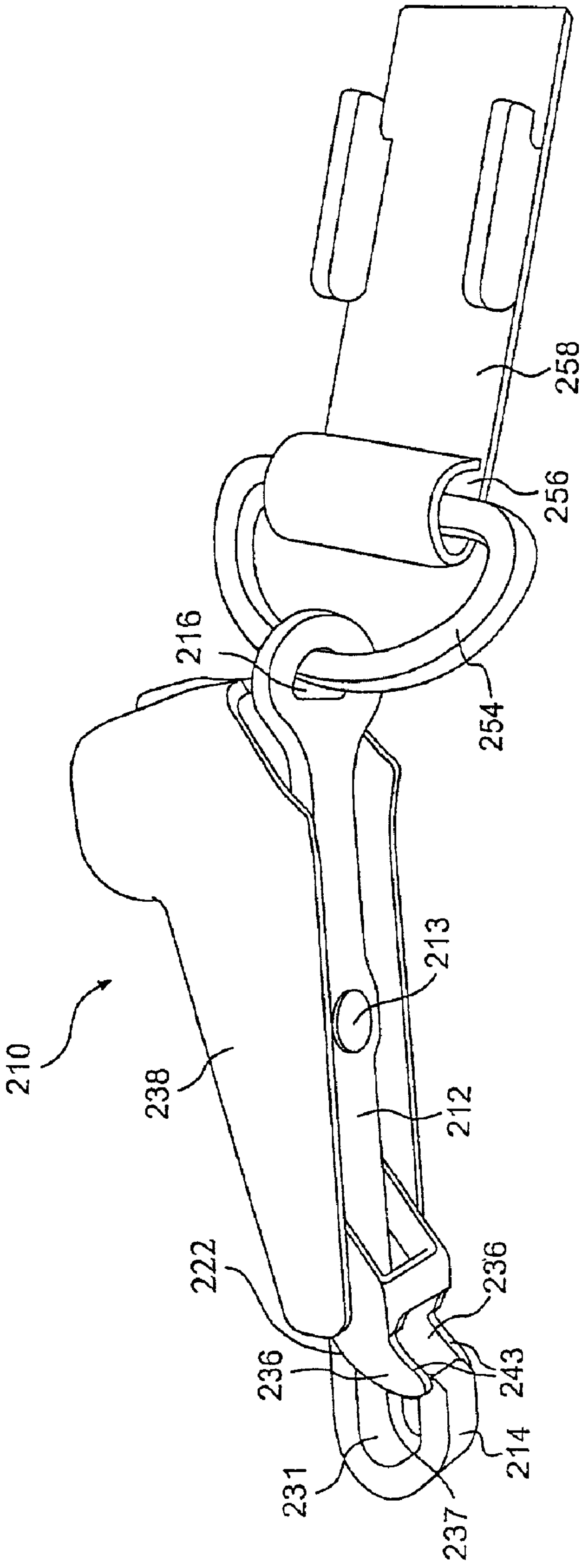
FIG. 10 is a perspective view of another embodiment of a latch device and adjuster arrangement in accordance with the present invention.

FIG. 10 shows a second embodiment of the invention. The latch device 210 of this second embodiment generally includes a housing 238, a main or central rigid member 212, and a closure member 222. The main member 212 is provided with a D-shaped connection aperture 216 at one end. A D-ring 254 interconnects the D-shaped connection aperture 216 with a connection passage 256 formed at one end of a chassis member 258 of a latch roller adjuster or the like.

The closure member 222 has blocking members 236 that are provided with engagement surfaces 243 at their front ends to catch an anchorage and to guide the anchorage into the anchorage receiving area 231 defined by hook 214. The blocking members 236 also have ramped surfaces 237 engageable with the anchorage in a manner which ensures that relative movement between the hook 214 and the anchorage received in the anchorage receiving area 231 tends to maintain the closure member 222 in its closure position.

Figure 11:
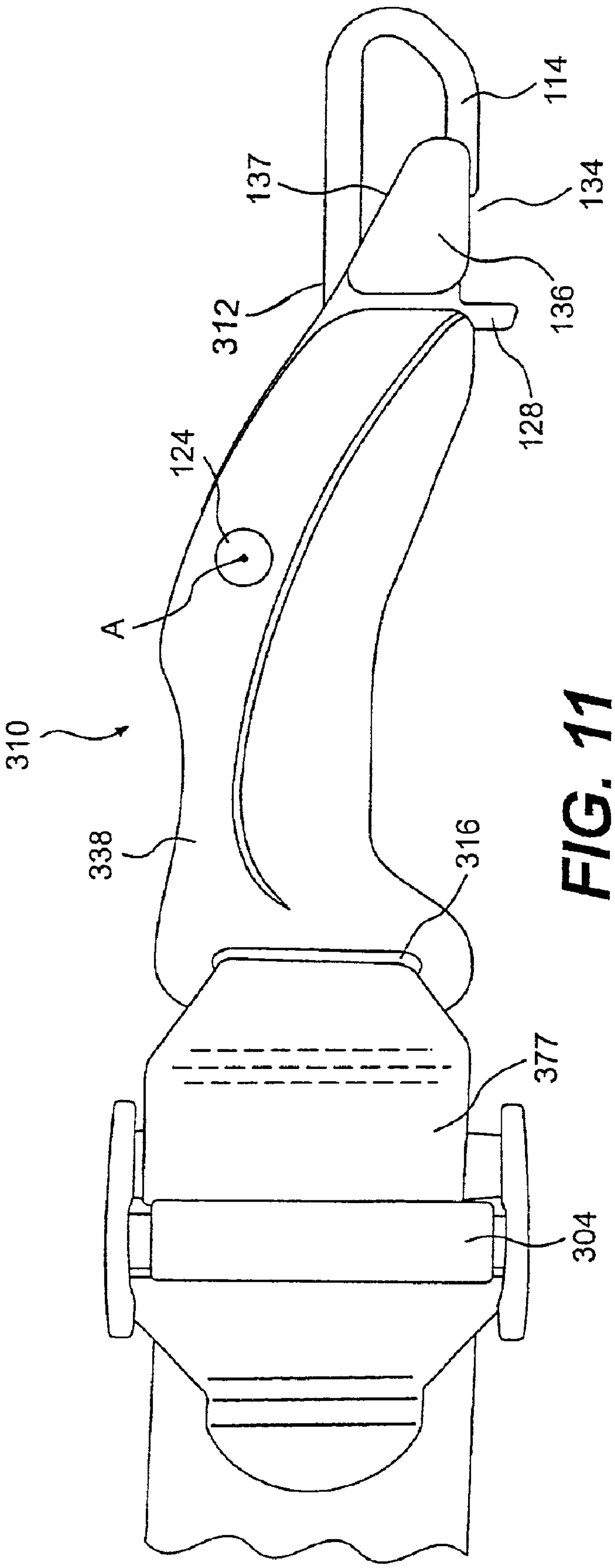
FIG. 11 is a side view showing a further embodiment of a latch device and adjuster arrangement in accordance with the present invention.

FIG. 11 shows another embodiment of the invention. The latch device 310 of this embodiment includes a housing 338. The end portion of the housing 338 sandwiches the corresponding end of a main, rigid member 312, which has been twisted or otherwise formed at a right angle relative to hook portion 114 of the main member 312. Both the housing 338 and the end of the main member 312 are formed with openings which combine to define a vertically oriented, elongate, connection aperture 316 through which a short piece of webbing 377 can be passed. This connection aperture 316 is arranged to extend in a direction which is essentially perpendicular to axis A about which the closure member can pivot.

The remaining structure and arrangement of the latch device 310 is similar to that shown and described in connection with the embodiments shown in FIGS. 3–9. Accordingly, the corresponding elements are denoted by like numerals.

It will be understood that this housing 338 can be adapted for use with main member 112 and closure member 122 as depicted in FIGS. 3–9 or, alternatively, with other latch arrangements, such as those shown in U.S. patent application Ser. No. 09/564,092 and U.S. patent application Ser. No. 09/870,709, both of which are incorporated herein by reference in their entirety.

Figure 12:
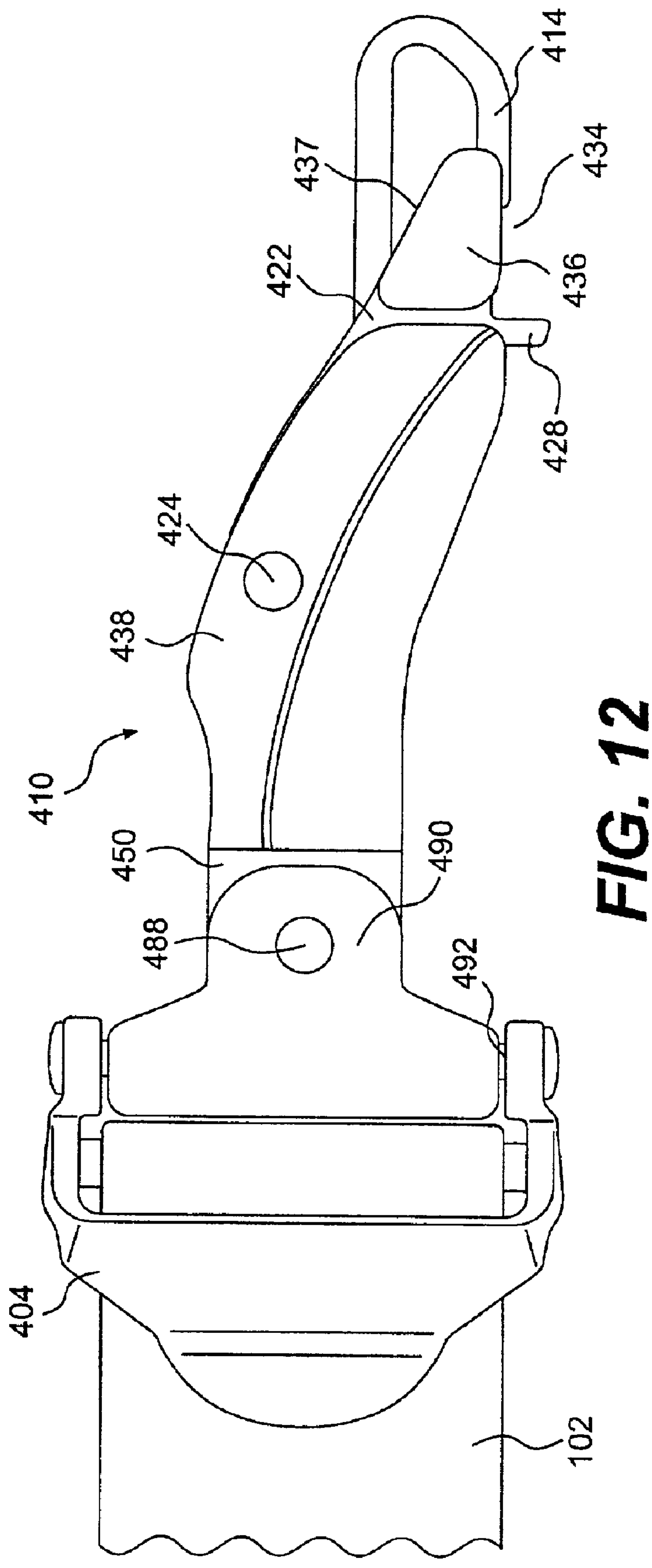
FIG. 12 is a side view showing yet another embodiment of the latch device and adjuster arrangement in accordance with the present invention, where the connection between the latch device and the adjuster is established through a pivot pin connection.

FIG. 12 shows a further embodiment of the invention. In this embodiment, the end of the closure member 422 opposite the hook 414 extends beyond the rear end of the housing 438 and includes a vertically oriented stamping 450. The stamping 450 is connected via a first pivot pin 488 to a T-shaped member 490 pivotally supported on the end of a latch roller adjuster 404 via pivot pin 492. As will be appreciated, this enables the latch device 410 to be pivotal about two axes that are normal to each other, that is, about the pivot axis defined by pivot pin 488 and the pivot axis defined by pivot pin 492. The structure and arrangement of the latch device 410 is otherwise similar to that disclosed in connection with the structures shown in FIGS. 3–9.

Figure 13:
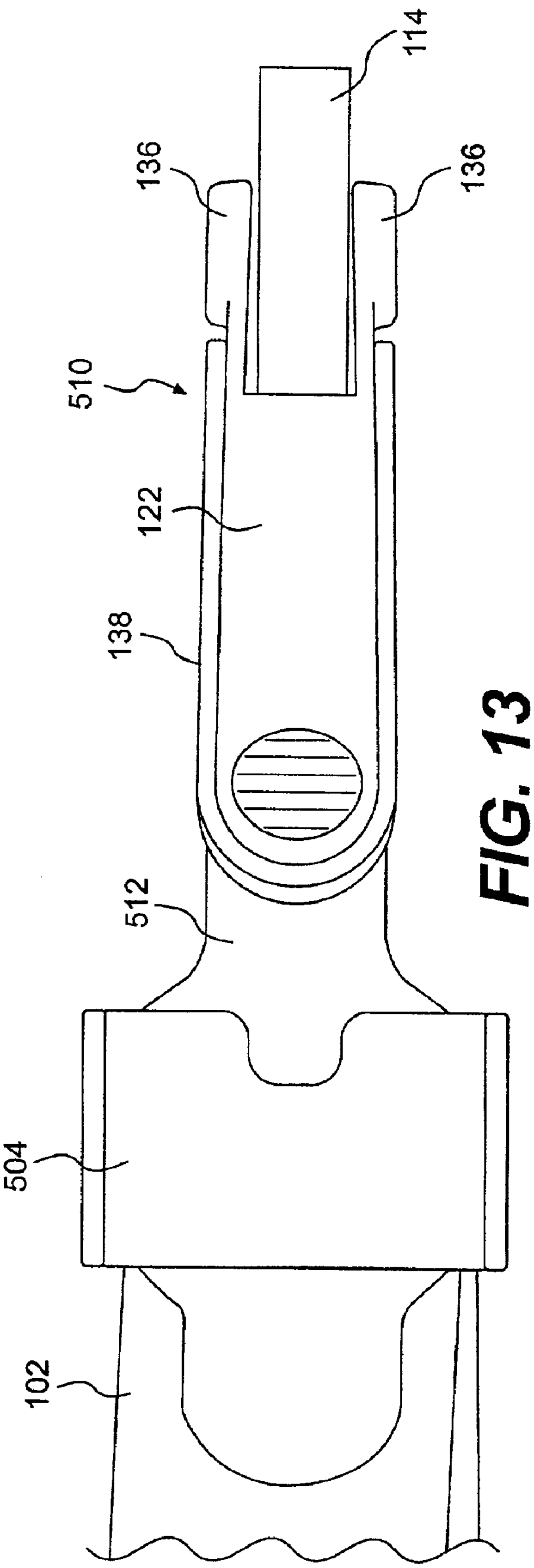
FIG. 13 is a plan view of still another embodiment of the latch device and adjuster arrangement, where the adjuster and the latch device are rigidly connected to one another.

FIG. 13 shows another embodiment of the invention. In this embodiment, the end of the main or central rigid member 512 of the latch device 510 is integrally/unitarily formed with the structure of the latch roller adjuster 504 so as to define a single unit. This arrangement enables the distance between the structures defining the latch device 510 and latch roller adjuster 504 to be controlled to a suitably short length. Other than the unitary construction, the arrangement of the latch device 510 is essentially the same as that disclosed in connection with the structures shown in FIGS. 3–9.

The particular materials employed for manufacture of the latch devices are dictated primarily by strength requirements, but such components as the housing for the latch device can be made out of lightweight materials such as plastics, sheet metal stampings and the like. The closure member of the latch device preferably is made of a plastic material, such as polypropylene, and, as mentioned above, the main member preferably is made of a metal material, such as steel.

The term "vehicle" in this application is meant to include vehicles where infant, toddler, or child seats are used, e.g., automobiles, sport utility vehicles, vans, trucks, planes, buses, trains, boats, and the like.

The latch devices 110, 210, 310, 410, 510 of the present invention are particularly suited for use in a non-rigid latch system with flexible webbing, as distinct from rigid or semi-rigid latch systems that employ rigid rods or shafts to connect the child seat to the anchorages; however, it will be understood that the latch devices also can be used in such rigid or semi-rigid latch systems.

Although the present invention has been described with reference to only a limited number of embodiments, given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A latch system for attaching a child seat to an anchorage of a vehicle seat, comprising:

a first latch device connected to a first end of a length of webbing;

an adjuster connected to a second end of the length of webbing, the adjuster having a plate member extending from one end, the plate member having a connection opening formed therein; and a second latch device, the second latch device including a main member having a hook at a first end and a connection aperture at a second end that is distal from the first end, a portion of the second end of the main member passing through the connection opening and a portion of the plate member passing through the connection aperture.

2. A latch system as set forth in claim 1, wherein the portion of the second end of the main member passing through the connection opening and the portion of the plate member passing through the connection aperture establishes a connection which enables relative movement between the latch device and the adjuster about three mutually perpendicular axes.

3. A latch system as set forth in claim 1, wherein at least the second latch device includes a closure member adapted to pivot between a closure position and a release position, and a spring to bias the closure member toward the closure position.

4. A latch system as set forth in claim 3, wherein the closure member includes an extension adapted to engage the anchorage and to move the anchorage toward a mouth of the hook of the second latch device.

5. A latch system as set forth in claim 3, wherein the closure member includes a blocking member, and wherein, when the closure member is in the closure position, the blocking member is located to prevent ingress/egress of the anchorage relative to the hook.

6. A latch system as set forth in claim 4, wherein the extension and the blocking member are oriented essentially perpendicular to each other.

7. A latch system as set forth in claim 1, wherein the hook has a mouth through which the anchorage can pass and become engaged by the hook, and wherein the second latch device further includes a closure member having blocking members, the closure member being pivotal with respect to the main member, wherein the blocking members are located on either side of an end portion of the hook and adjacent the mouth so as to block ingress/egress of the anchorage relative to the hook, the closure member being pivotable away from a closure position to a release position to move the blocking members away from the mouth of the hook, thereby permitting ingress/egress of the anchorage relative to the mouth of the hook.

8. A latch system as set forth in claim 7, further comprising a housing, the housing being connected to the main member and pivotally supporting the closure member on the main member.

9. A latch system as set forth in claim 7, wherein the closure member further includes an extension member that extends between and interconnects the blocking members and that extends beyond lower edges of the blocking members so as to be abutable with the anchorage when the second latch device is brought into contact with the anchorage.

10. A latch system as set forth in claim 7, comprising a spring operatively disposed between the main member and the closure member, the spring biasing the closure member toward the closure position.

11. A latch system as set forth in claim 8, wherein the housing encloses a mid-portion of the main member, and wherein the second latch device further comprises a pivot shaft supported by the housing and about which the closure member pivots relative to the hook.

12. A latch system as set forth in claim 7, wherein the connection aperture extends in a direction that is essentially perpendicular to an axis about which the closure member is pivotal.

13. A latch device as set forth in claim 1, wherein the connection aperture is elongate.

14. A latch system as set forth in claim 1, wherein the second latch device is coupled to the adjuster to permit the second latch device and the adjuster to be movable with respect to one another about three mutually perpendicular axes.

15. A latch system as set forth in claim 1, wherein the connection is D-shaped.

16. A latch system for attaching a child seat to an anchorage of a vehicle seat, comprising:

a first latch device connected to a first end of a length of webbing;

an adjuster connected to a second end of the length of webbing, the adjuster having a plate member extending from one end, the plate member having a connection opening formed therein; and a second latch device, the second latch device including a main member having a hook at a first end and a connection aperture at a second end that is distal from the first end, a portion of the second end of the main member passing through the connection opening and a portion of the plate member passing through the connection aperture, wherein one of the connection aperture and the connection opening has an hourglass shape.

17. A latch device comprising:

a housing, a main member having a hook at one end and a connection aperture at an opposite end, the hook having a mouth adapted to permit an anchorage to pass therethrough and to become engaged by the hook, and a closure member having blocking members, the closure member being pivotally supported on the housing and biased toward a closure position, wherein the blocking members are located on either side of an end portion of the hook and adjacent the mouth so as to block ingress/egress of the anchorage relative to the mouth of the hook, the closure member being pivotable away from the closure position to a release position to move the blocking members away from the mouth of the hook, thereby permitting ingress/egress of the anchorage relative to the mouth of the hook, wherein the connection aperture is hourglass-shaped.

* * * * *